United States Patent Office 2,804,459
Patented Aug. 27, 1957

2,804,459
PREPARATION OF 4-AMINOURACIL

Russell D. Drinkard, Waterford, Conn., assignor to Chas. Pfizer & Co., Inc., New York, N. Y., a corporation of Delaware No Drawing. Application February 23, 1955,
Serial No. 490,155

4 Claims. (Cl. 260—256.4)

This invention is concerned with a method for the manufacture of valuable chemical intermediates. In particular, it is concerned with a method for the manufacture of 4-aminouracil which may be used for the synthesis of such compounds as theophylline and caffeine, as well as other xanthine compounds.

It is known that in the presence of a strong solution of caustic, cyanoacetylurea is cyclized to 4-aminouracil. However, if this is done under the most effective conditions using a high proportion of starting material in a strong solution of sodium hydroxide or of potassium hydroxide, there is formed, upon termination of the reaction, a hard mass which is extremely difficult to handle. If large volumes of materials are prepared, the mass, which solidifies upon completion of the reaction, is only removed from the manufacturing equipment with the greatest of difficulty. Furthermore, there is a tendency for the mass of material to slow down agitators and otherwise impair operation of the process. Local overheating of batches of material is encountered due to the exothermic nature of the reaction and this may lead to appreciable loss in yield and quality of product.

It has now been found that by utilizing a mixture of sodium hydroxide and potassium hydroxide the reaction mixture that results upon completion of the cyclization reaction is very much easier to handle, consisting of a soft soap-like mixture or, with the most desirable proportion of alkalies, a clear solution. Why a mixture of the caustic agents should result in such a favorable outcome for the reaction is not clear. However, the process step is definitely improved by the procedure described in this application.

In general, a molecular proportion of sodium hydroxide to potassium hydroxide of from about one and one-half to about three to one has been found desirable in conducting the present process. A proportion of about two moles of sodium hydroxide to one mole of potassium hydroxide seems to be most effective. Somewhat higher or lower ratios are not seriously deleterious. The caustic materials are used in aqueous solutions ranging in concentration from about 30% to about 60% by weight, most useful concentrations being about 50% by weight. From about two to about four moles of combined caustic (sodium and potassium hydroxides) per mole of cyanoacetylurea has been found to be a suitable ratio. Commercially available strong caustic solutions are quite useful. In operating the process, the mixture of caustic solutions, that is, strong sodium hydroxide and potassium hydroxide, is placed in a suitable vessel equipped with a mechanical agitator. Cyanoacetylurea is gradually added and the temperature is maintained in the range from about 35° C. to about 60° C. and most preferably at 45° C. to 55° C. During the earlier stages of the reaction, such a temperature must often be maintained by cooling the reaction mixture. After the initial evolution of heat has been exhausted, heating may be applied to the mixture to maintain the elevated temperature. This is generally maintained for several hours (i. e. 2 to 10 hours) to complete the process. The speed of reaction depends upon temperature, amount of material, etc. The mixture is then treated with water and with acid to lower the pH to about 6.0. To avoid decomposition, the temperature of the mixture is not allowed to rise above 60° C. during this stage of the process.

In general, the product prepared according to the above process may be isolated by filtration, washing and drying. 4-aminouracil thus obtained is of high purity, assuming that good quality cyanoacetylurea is used as starting material and the other precautions outlined above are observed. Furthermore, the material may be obtained in yields of over 90%. Since the product is somewhat soluble in the aqueous reaction mixture after acidification, yields are most easily determined by carrying out the next stage of the process of making xanthine intermediates, that is, treatment of the aminouracil with nitrous acid to obtain 4-amino-5-nitrosouracil, which is isolated in high yield and good quality when prepared from the product obtained by the present method. Since the nitroso compound has a low aqueous solubility, it may be isolated readily without regard for the very minor proportion left in mother liquors after filtration. The product obtained by the present process may be utilized as a suspension in water for conversion directly to the nitroso compound and need not be isolated in dry form.

The following example is given by way of illustration and is not to be considered as the sole embodiment of this invention. It is to be understood that protection hereof is only to be limited by the specific wording of the appended claims.

Example

To a sixty-gallon stainless steel reactor with a mechanical stirrer was added 3.55 liters of 52% by weight potassium hydroxide solution and 10.63 liters of 50% by weight sodium hydroxide solution. The mixture was stirred and 13.2 pounds of cyanoacetylurea was added over a period of three-quarters of an hour. During the addition, the temperature of the mixture was maintained at 50° C.–55° C. by circulating cold water through the jacket of the stainless steel vessel. The temperature was maintained at 50° C.–55° C. for a further two and one-half hours by circulating hot water through the jacket. The reaction mixture remained completely fluid throughout these steps. (Use of only sodium hydroxide or potassium hydroxide with no other change in the process resulted in an intractable mixture.) Seven and one half liters of water were added to the mixture and the pH was adjusted to 6.0 with a mixture of 96 pounds of ice, an equal amount of water and 9.85 liters of concentrated sulfuric acid. The temperature of the mixture was maintained at 40° C.–50° C. by circulating cooling water through the jacket of the vessel. 4-aminouracil was obtained in high yield as a slurry of white solid.

What is claimed is:

1. A process for the preparation of 4-aminouracil which comprises contacting cyanoacetylurea with a concentrated aqueous mixture of sodium hydroxide and potassium hydroxide at an elevated temperature.

2. A process as claimed in claim 1 wherein the sodium hydroxide and potassium hydroxide solutions have a concentration of from about 30 to about 60% by weight.

3. A process as claimed in claim 1 wherein there is employed from about one and one-half to about three molecular proportions of sodium hydroxide to about one molecular proportion of potassium hydroxide.

4. A process for the preparation of 4-aminouracil which comprises contacting one molar proportion of cyanoacetylurea with a mixture of aqueous solutions of sodium hydroxide and potassium hydroxide, the molecular proportion of sodium hydroxide to potassium hydroxide being from about one and one-half to about three, the molecular ratio of combined caustic to cyanoacetylurea being from about two to about four, and the temperature of the reaction mixture being maintained at from about 35° C. to about 60° C. for from two to ten hours and isolating the so-produced 4-aminouracil.

References Cited in the file of this patent
UNITED STATES PATENTS
2,567,651    Papesch et al. _____ Sept. 11, 1951